United States Patent [19]

Kahn

[11] 3,885,216

[45] May 20, 1975

[54] BIMODE COMMUNICATION SYSTEM WITH FREEZE CIRCUIT

[76] Inventor: Leonard R. Kahn, 70 N. Grove St., Freeport, N.Y. 11520

[22] Filed: Oct. 19, 1973

[21] Appl. No.: 407,891

[52] U.S. Cl. .................................... 325/22; 325/315
[51] Int. Cl. ............................................. H04b 1/40
[58] Field of Search .................. 329/1, 2; 332/1, 68; 325/15, 18, 21, 22, 103, 315, 316, 317

[56] References Cited

UNITED STATES PATENTS

| | | | |
|---|---|---|---|
| 3,345,571 | 10/1967 | Selwyn | 325/316 |
| 3,401,341 | 9/1968 | Kahn | 325/316 |
| 3,688,197 | 7/1972 | Kahn | 325/317 |

*Primary Examiner*—Benedict V. Safourek
*Attorney, Agent, or Firm*—Albert F. Kronman

[57] ABSTRACT

A communication system using radio telephone send-receive components. A main station, such as a shore based radio telephone, is equipped to receive and analyze the signals received from a boat and determine its modulation mode, whether amplitude modulation, frequency modulation, or single side band transmission. When the modulation mode has been established, the main station transmitter mode is adjusted to match the received mode and the circuit is frozen to such a mode for the remainder of the message, regardless of noise, or other received signals.

7 Claims, 3 Drawing Figures

PATENTED MAY 20 1975 3,885,216

SHEET 01 OF 2

BIMODE COMMUNICATION SYSTEM WITH FREEZE CIRCUIT

RELATED U.S. PATENTS

| | | | |
|---|---|---|---|
| 3,401,341 | L.R. Kahn | issued | Sept. 10, 1968 |
| 3,588,701 | L.R. Kahn | issued | June 28, 1971 |
| 3,688,197 | L.R. Kahn | issued | Aug. 29, 1972 |

BACKGROUND OF THE INVENTION

There are many systems of radio frequency modulation in use today. These include amplitude modulation with carrier and both side bands, single side band with full carrier, single side band with reduced carrier, and frequency modulation. Remote stations, especially installations on boats, use a single modulation means, the same for both transmitting and receiving. When such a station sends a signal to a shore station, it is first necessary to use the proper receiving equipment, and then the return signal must be in the same modulation mode as the received signal.

The three patents listed above show how a receiver circuit can be used to determine the modulation mode. A peak detector and an average detector, as described in U.S. Pat. No. 3,588,701, determine the difference between amplitude modulation and single side band modulation. This patent also describes circuits for determining the existence of frequency modulation waves and whether the upper or lower side band is used. However, there is still a problem with such systems when the radio channels are used by a number of subscribers having operators with little operating training. There may be times when a user will attempt to break in on a conversation and interfere with traffic by using differing modulation modes to switch the mode of transmission and greatly degrade the signal.

The present invention includes circuits which freeze the mode of transmission and reception once the mode has been established. The freeze circuit maintains the modulation mode even under severe interference and noise. At the completion of the transmission between the stations, the freeze circuit is caused to revert to the unfrozen condition and is ready for the next incoming signal. The circuit also includes a squelch arrangement whereby the lack of any incoming signal disables the decision circuitry. A control is provided whereby the operator can switch the circuit to a freeze condition.

One of the features of the invention includes the combination of three control circuits; a bi-mode switch, a squelch circuit, and a timed freeze circuit, all of which operate in unison and complement each other.

Another feature of the invention are the timing circuits which hold the gates in their open or closed conditions until an average array of voltage pulses is received.

SUMMARY

The invention includes a gate circuit having seven gates and operating to switch a transmitter circuit to one of two transmission modes responsive to the modulation mode of a received signal. The invention also includes a timed freeze circuit for maintaining the circuit in its switched condition. The circuit also includes a blanked or squelch means for reducing the output to zero whenever there is an absence of radio frequency input. The switching means is a bistable multivibrator which remains in its switched condition until operated by the sensing of a different modulation mode. Comparison circuits, including transistors are employed to compare the input voltage (+10v or 0v.) to a median voltage (5 volts) and thereby operate the switching means.

Additional details of the invention will be disclosed in the following description, taken in connection with the accompanying drawings forming part hereof.

DESCRIPTION OF THE PREFERRED EMBODIMENT

Figure 1:
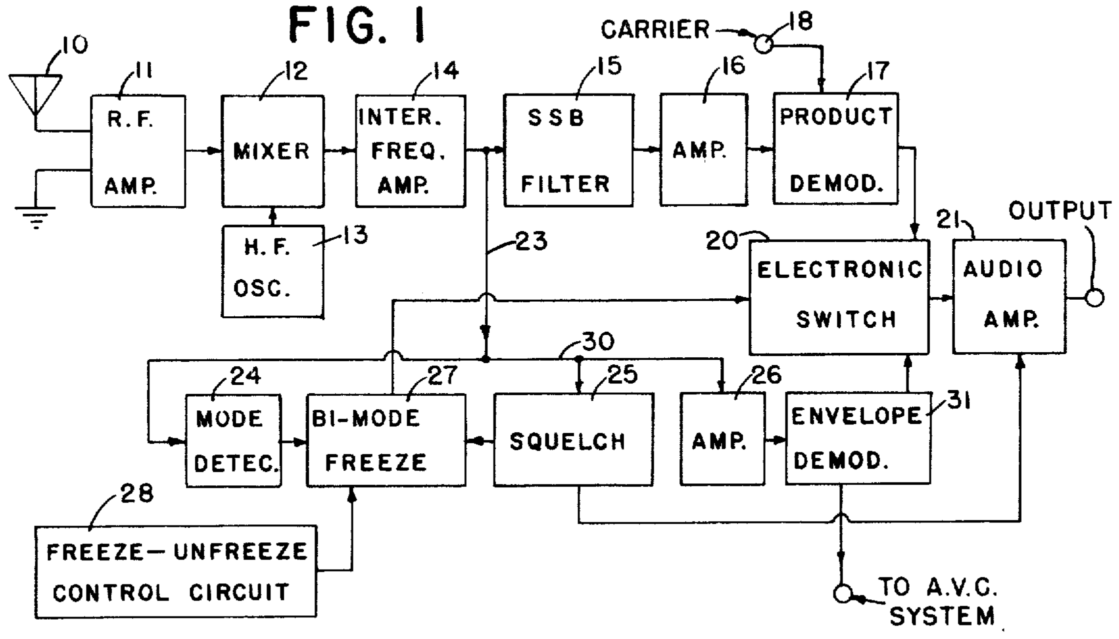
FIG. 1 is a general circuit diagram of the entire receiving circuit, showing the main components in block form.

Referring to the drawings and particularly to FIG. 1, the entire receiving circuit will be described in general terms. An antenna 10 is connected to a radio frequency amplifier 11 for collection of the incoming signals. The output of this circuit is applied to a mixer circuit 12 where the signals are mixed with the waves of a high frequency oscillator 13. After demodulation, the signals are next amplified by an intermediate frequency amplifier 14, filtered by a single side band filter 15, amplified again by amplifier 16 and then demodulated by a product demodulator 17 which is supplied by a carrier frequency applied to terminal 18. The result is passed through an electronic switch 20 and then amplified for a third time by audio amplifier 21. The output of the audio amplifier is applied to an output terminal and the usual load, a loud speaker or a head set receiver.

In order to evaluate the modulation mode of the received signal, a tap 23 is connected to the intermediate frequency amplifier 14 and this signal is applied to a modulation mode detector 24, a squelch circuit 25, and an amplifier 26. The modulation mode detector circuit 24 has been shown and described in U.S. Pat. No. 3,588,701, issued June 28, 1971, where amplitude modulation signals are sensed from SS Band frequency modulated signals. The output of the mode detector is applied to the bi-mode freeze circuit 27, shown in greater detail in FIGS. 2 and 3. The bi-mode freeze circuit 27 may be controlled by a freeze-unfreeze circuit 28 if the operator desires. If circuit 28 is not operated, the output of the bi-mode freeze circuit is applied to an electronic switch 20 which controls the transmission circuit (not shown) to operate in the same modulation mode as the received signal. U.S. Pat. No. 3,588,701 discloses such a switching means controlled by sensing circuits. The bi-mode freeze circuit 27 is also controlled by the squelch circuit to blank all operations when there is no signal received. When the received wave is amplitude modulated, the signal is taken from the output of the intermediate frequency amplifier 14 and applied over lines 23 and 30 to amplifier 26 and a simple envelope demodulator 31 where the wave is rectified and sent through switch 20 to the audio amplifier 21.

Figure 2:
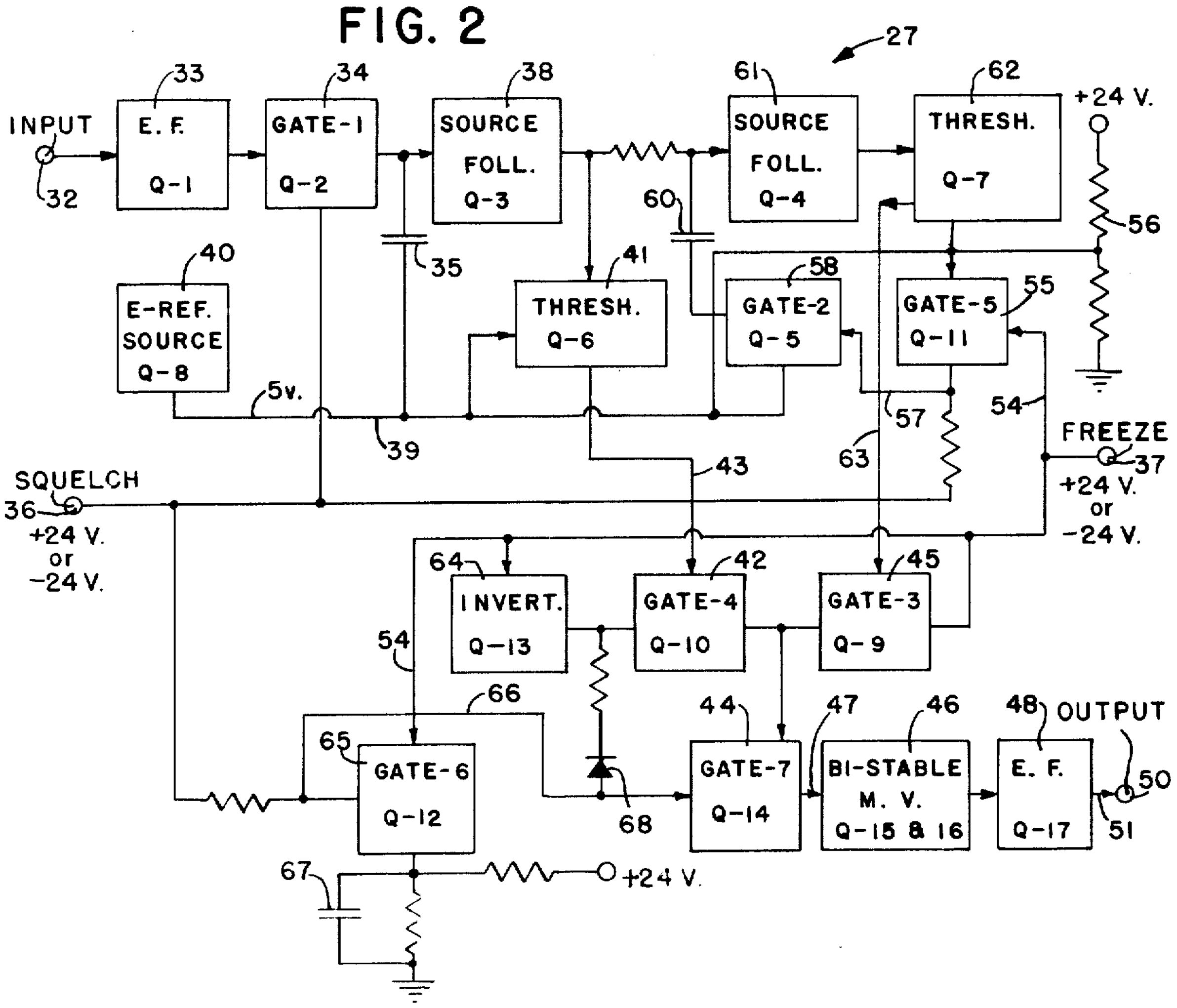
FIG. 2 is a schematic diagram of connections, also in block, showing the electronic switch of FIG. 1 in greater detail.

Referring now to FIG. 2, the bi-mode freeze circuit 27 will first be described in general terms. The input terminal 32 is connected to the output of the sensing circuits, described in U.S. Pat. No. 3,401,341, which provides a signal of +10 volts when amplitude modulation wave is received and zero volts when a single sideband wave is received. This voltage is received by an emitter follower circuit 33, acting as a buffer and then applied to the first gate circuit 34. When a signal of + 10 volts is present, the gate 34 is made conductive and the signal is passed through to charge a large capacitor 35. It is assumed that a squelch voltage of + 24v is applied to terminal 36 at this time. It is also assumed that the freeze voltage, applield to terminal 37 is −24 volts, permitting the circuit to act only on the value of the input voltage applied to terminal 32. At this time, the same signal is applied to a source follower stage 38. Storage capacitor 35 is connected to a voltage reference conductor 39 which is held at +5 volts, or about half-way between the AM signal of 10 volts and the SSB signal of 0 volts. This potential is provided by circuit 40 and lowers the time it takes for capacitor 35 to charge during the start up operation and avoids biasing the system in either mode.

The voltage through the source follower stage 38 is next applied to a threshold stage 41. This circuit compares the voltage from the source follower 38 with the reference voltage and switches its operation to either AM or SSB accordingly. This output is used to select the operating mode indication just prior to the automatic freeze of the system. The threshold circuit 41 is connected to a gate-4 circuit 42 by conductor 43. When gate-4 is in the unfrozen condition, it sends a signal to a gate-7 circuit 44 which is thereby made conductive connecting gates 3 or 4, circuits 45 or 42 to the bistable multivibrator circuit 46 by means of conductor 47. When circuit 46 is triggered to transfer its conductance to a different state, it will remain "latched" into that state until acted upon by other control voltages. Multivibrator circuit 46 is connected to an emitter follower circuit 48 which in turn applies a current pulse to output terminal 50 by conductor 51 (see also FIG. 3).

Output terminal 50 may be connected to any switching means in the associated transmitter circuit. In U.S. Pat. No. 3,688,197, a relay 21 is used. In U.S. Pat. No. 3,588,701, both a relay and a gate circuit are shown for this purpose. It should be noted that circuit 44 is conductive during periods when there is no freeze voltage applied and whenever the squelch line transmits a +24 volt signal. When there is no signal applied to terminal 32 circuit 44 is non-conductive.

The freeze condition is applied by an operator who wishes to maintain the circuit in its present condition, either AM or SSB. As shown in greater detain in FIG. 3, a switch arm 52 is moved to the middle terminal 53 to apply +24 volts to conductor 54 and the gate-5 circuit 55. This action makes gate-5 conductive, applying a positive voltage from the voltage divider 56 to the control line 57 of the gate-2 circuit 58, thereby making circuit 58 conductive and connecting capacitor 60 to the reference voltage line 39. The voltage across capacitor 60 is applied to a source follower circuit 61 and a second threshold circuit 62. The voltage received by circuit 62 is compared with the reference voltage (5v) on conductor 39. The result of this comparison is fed over conductor 63 to circuits 45,44, and 46 to maintain the multivibrator in whatever state it was in.

Capacitor 60 is an integrating capacitor which receives its charge from terminal 32. If the AM signals from terminals 32 keep the capacitor charges more than 50 percent of the time, the output of the threshold circuit 62 indicates an AM operation. If SSB signals are received more than 50 percent of the time, circuit 62 will indicate SSB operation. The output of the Q-7 threshold circuit 62 is applied to Gate-3 circuit 45 which is made conductive when the freeze signal is received on the control line 54. Since the gate-4 circuit 42 receives an inverted input through circuit 64, and gate-3 receives a direct signal, only one of these gates applies signals to gate-7 at any one time.

Let it now be assumed that a freeze signal (+24V) has been applied to the control conductor 54. Gate-2 conducts so that the voltage across capacitor 60 is available. Gate-3 is made conductive and Gate-4 is made nonconductive so that the voltage applied to circuit 62 passes through Gate-3 to Gate-7, circuit 44. Gate-7 is closed momentarily to activate the multivibrator 46 by the following action: When the freeze voltage is applied over conductor 54, it also makes Gate-6 circuit 65 conductive and the pulse sent through it, over conductor 66, makes circuit 44 conductive and the threshold voltage of circuit 62 is then passed to the multivibrator which assumes whichever condition the threshold circuit indicates. Circuit 44 remains conductive until capacitor 67 charges to a negative voltage by the action of the negative current through diode 68 so that finally circuit 44 again becomes nonconductive leaving the multivibrator in its last mode as indicated by the condition of circuit 62.

The squelch control voltage is normally at +24 volts when a signal is received. When the signal is absent the squelch circuit applies a −24 voltage to circuit 34, also to gates 2, 5 and 6, cutting off all action. A squelch circuit has been described in U.S. Pat. No. 3,588,701.

Figure 3:
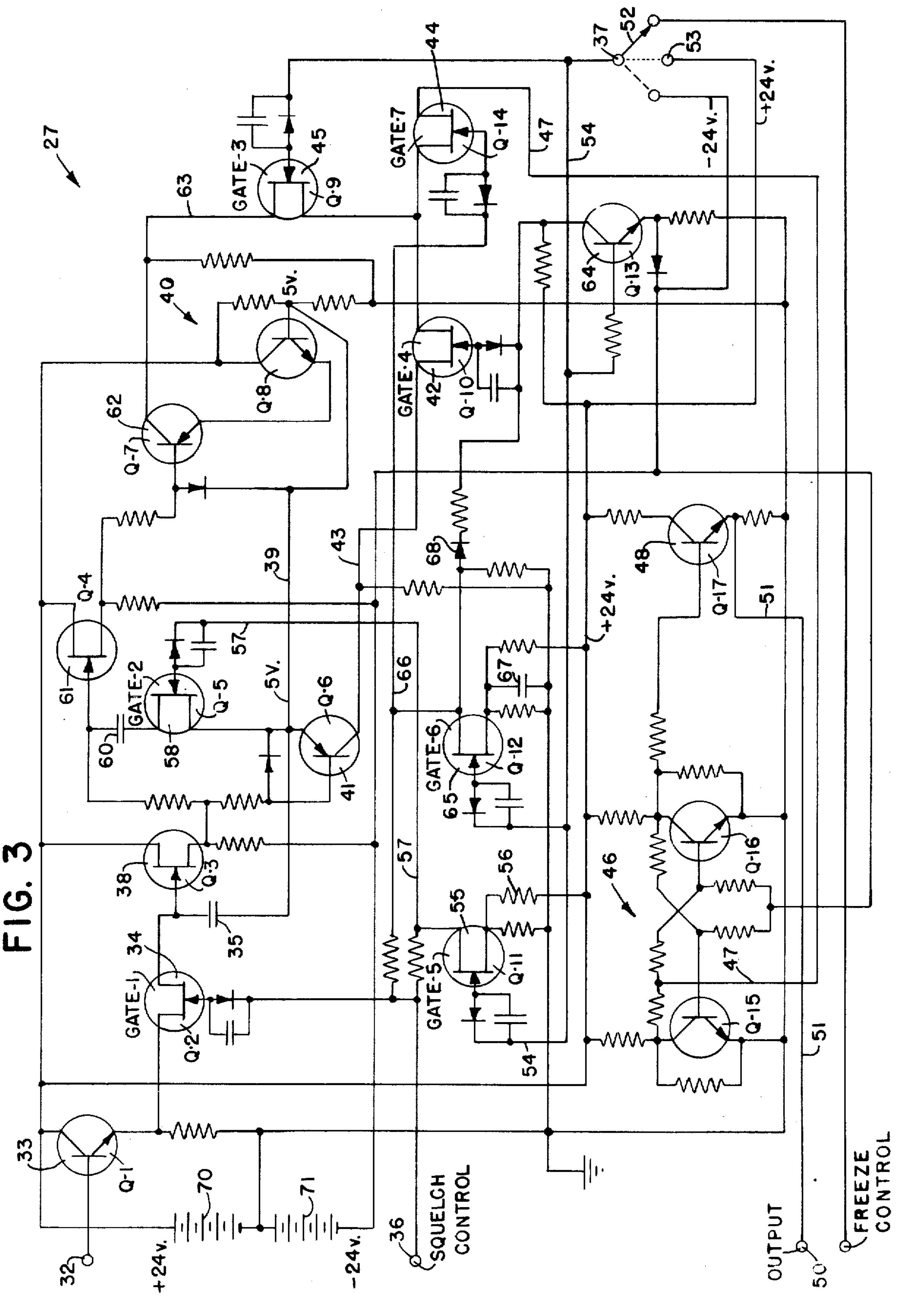
FIG. 3 is a schematic diagram of the circuit of FIG. 2, but showing all the circuit details.

The detailed circuit shown in FIG. 3 shows one system of reducing the gate circuits to practice. In this circuit, all seven of the gates are field effect transistors (FET), storage capacitor 35 has a value of 50 microfarads, integrating capacitor 60 has a value of 25 microfarads, and capacitor 67 in the gate-6 circuit has a value of 3.4 microfarads. The circuit is powered by two sources of electric power which may be batteries 70 and 71, each of 24 volts.

Having thus fully described the invention, what is claimed as new and desired to be secured by Letters Patent of the United States is:

1. A switching control circuit for switching a transmit-receive circuit into a latching condition in one of two modulation modes responsive to the sensed mode of the received signal comprising:

a. a first normally conducting gate circuit for receiving the sensed mode signal and for delivering a signal when the amplitude modulation wave is sensed;

b. a storage capacitor connected to the first gate circuit for collecting and holding a charge when a signal is passed by the first gate circuit;

c. a comparison circuit coupled to the storage capacitor for comparing the voltage it produces with a reference voltage;

d. a second normally conducting gate connected to the comparison circuit for transmitting the sensed mode signal; and, e. switching means including a bistable multivibrator coupled to the comparison circuit in series with the second gate circuit for latching the multivibrator into a conductance condition which applies a signal to the transmit-receive circuit to cause the transmit portion to operate in the mode of the received signal.

2. A control circuit according to claim 1 wherein said first gate is connected to a squelch control circuit for making the gate nonconductive when a squelch signal is received due to the absence of a signal.

3. A control circuit according to claim 1 wherein said second gate is connected to a squelch control circuit in series with a diode for making the gate nonconductive when a squelch signal is received.

4. A control circuit according to claim 1 wherein a voltage reference is applied to one side of the first storage capacitor and to the comparison circuit for comparison with the input signal and to produce a positive voltage when one signal is received and a negative signal when a second signal is received.

5. A control circuit according to claim 1 wherein a freeze voltage circuit is coupled to a plurality of circuit components for disabling their action and for maintaining the multivibrator circuit in its last operated condition.

6. A switching circuit according to claim 1 wherein both of said gates are field effect transistors.

7. A method of temporarily disabling a switching control circuit in a transmit-receive communications system which includes; determining the modulation mode of the received signal by electrical means; developing an electrical signal responsive to the sensed modulation mode; applying the electrical signal to a latching circuit to maintain a control voltage responsive to the modulation mode of the received signal; and applying a freezing voltage to the latching circuit to maintain the receiving circuit in its operated condition for a desired time interval.

* * * * *